Figure 2:
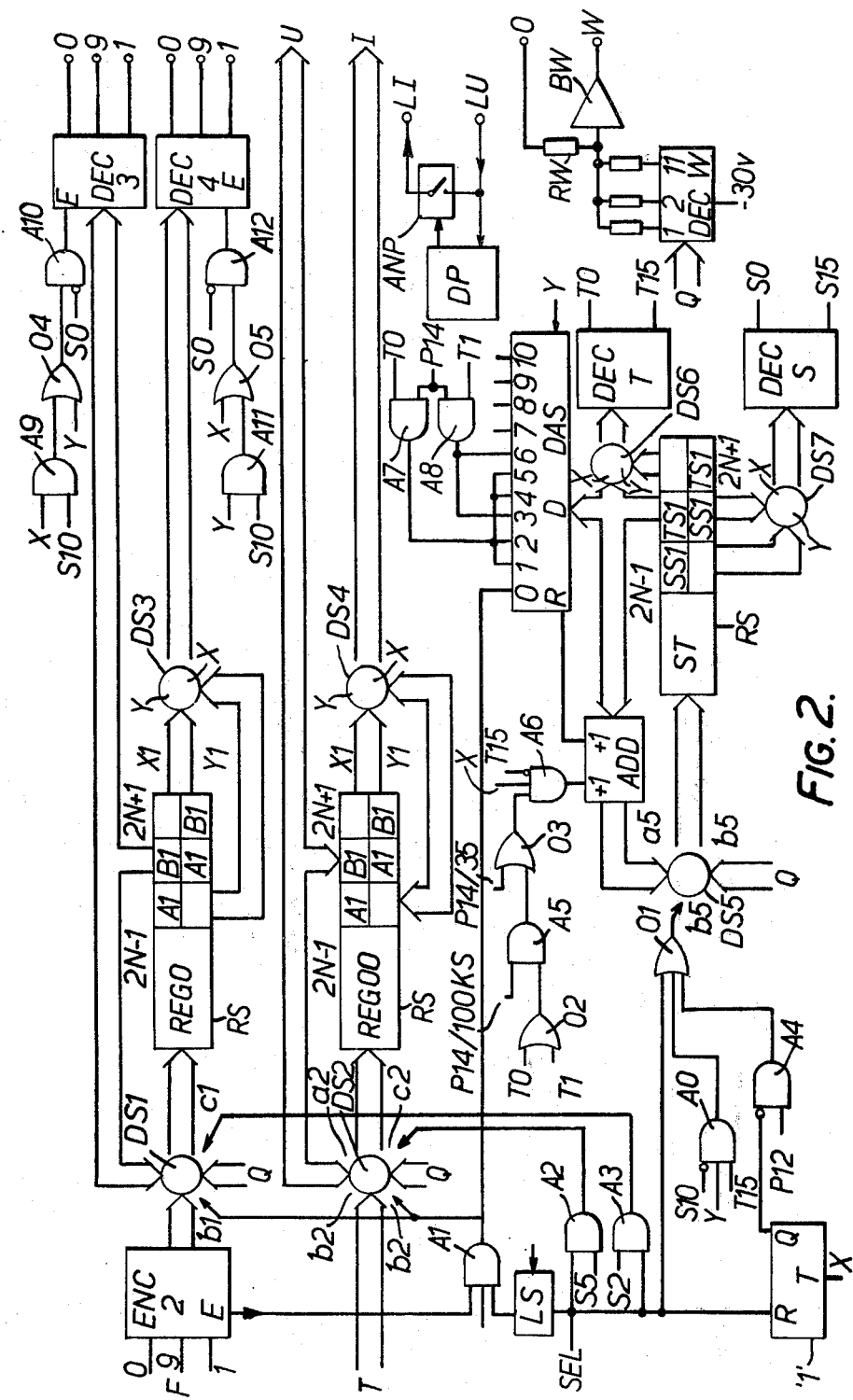

United States Patent [19]
Andersen

[11] 3,987,249
[45] Oct. 19, 1976

[54] SYSTEM FOR ADDRESSED TIMEMULTIPLEXED TELECOMMUNICATION

[75] Inventor: Bjorn Andersen, Osteras, Norway
[73] Assignee: Maxman AG, Chur, Switzerland
[22] Filed: May 13, 1975
[21] Appl. No.: 576,992

[30] Foreign Application Priority Data
May 16, 1974 Norway.............................. 1802/74

[52] U.S. Cl. ......................... 179/15 BY; 179/84 SS
[51] Int. Cl.² ........................................ H04Q 1/38
[58] Field of Search............ 179/15 A, 15 R, 18 GF, 179/84 A, 84 SS, 86, 15 BY, 15 AZ; 178/58 R

[56] References Cited
UNITED STATES PATENTS
3,758,719  9/1973  Klose ................................ 178/58 R Primary Examiner—David L. Stewart
Attorney, Agent, or Firm—Young & Thompson

[57] ABSTRACT

A system for addressed time multiplexed telecommunication comprising subscribers apparatus whose address selector supplies voltage levels which in a central exchange are converted to binary form and stored in address shift registers. Taken out of the registers the addresser's and addressee's addresses are converted to analogue form and compared with a step voltage from a step voltage generator, and the result of the comparison controls analogue switches which make the connection between the addresser and the addressee and break the connection when addresser or addressee presses an off-button.

6 Claims, 7 Drawing Figures

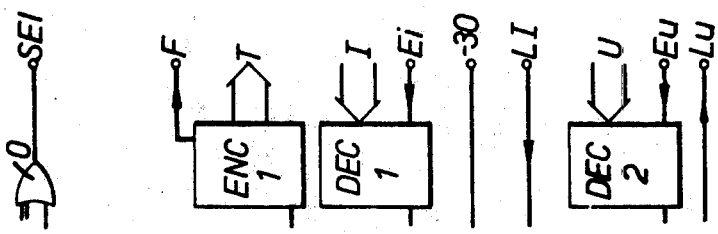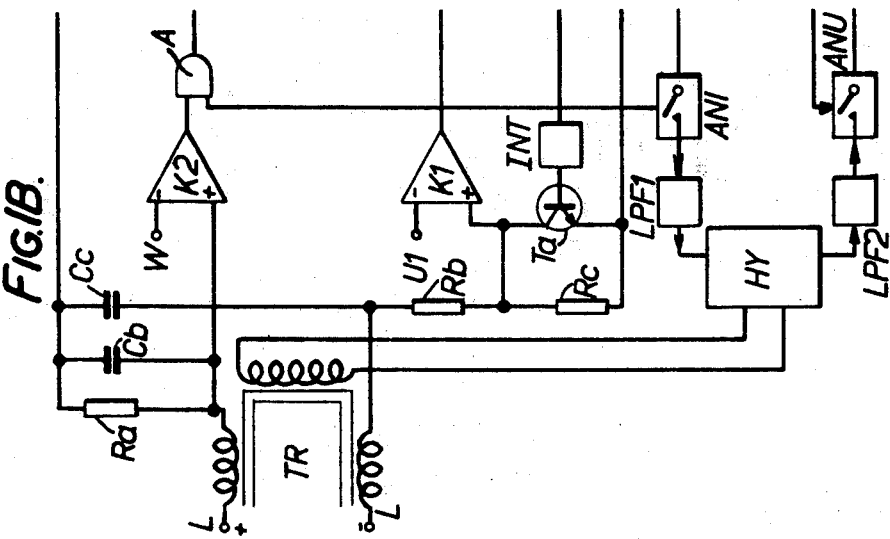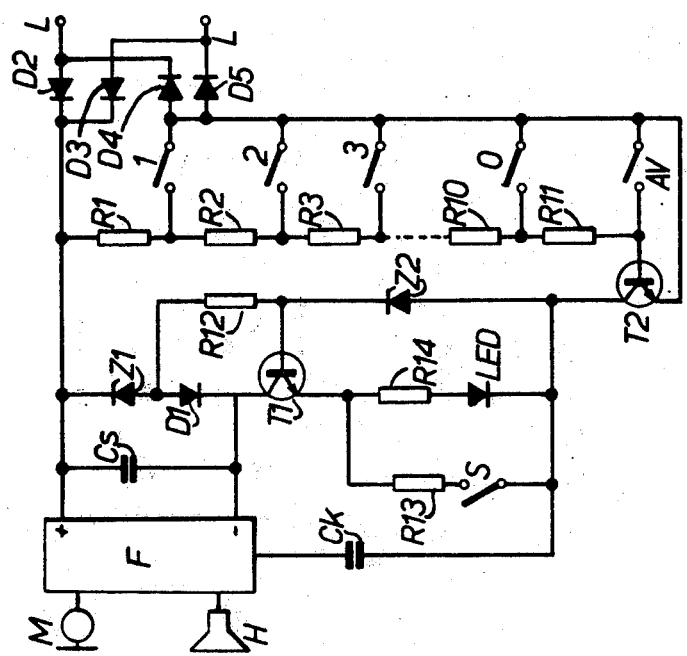

SYSTEM FOR ADDRESSED TIMEMULTIPLEXED TELECOMMUNICATION

The invention relates to a system for addressed time multiplexed telecommunication, comprising apparatus each having an information transmitter; for example, a microphone, and an information receiver; for example, a loudspeaker, optionally associated amplifiers; a hybrid junction and address selector; and a central exchange having an apparatus unit with connection transformer and separation circuits for each apparatus; an impulse generator which transmits impulses for operation of the unit; registers for storage for addresses and status of the apparatus, and logical circuits. Systems of this kind have hitherto been provided with address memories with direct connection to each apparatus which, despite the very small number of apparatus and communication, are comparatively complex and expensive constructions.

The object of the invention is to provide a system having a substantially simplified and less expensive construction.

According to the invention, this is achieved in that the impulse generator continuously transmits impulse trains with at least 12 selection impulses, and also continuously transmits shift impulses for the registers and for time multiplexing, and control impulses for encoders and decoders in determined relationship to the selector impulses and for control of the step voltage generator; the address selector being a voltage divider which, on actuation, supplies voltage levels corresponding to the address, which are applied to a first comparator in which the address selector voltage is compared with a permanent reference voltage to whose output signal, codes are applied for conversion from analogue to binary form and, under the control of free communication time phase, the addresser's own address is introduced by cypher into the address shift registers, a communication status displacement being effected simultaneously in a status-time-shift register, and the output signals from address shift registers are applied to decoders for conversion from binary to analogue form and cause the output signal from a second comparator, in which the voltage levels of the address selectors are compared with the step voltage from the step voltage generator, to establish the time phase for the selected address cyphers in the impulse series inserted in the address shift registers in binary form, and effecting, at the same time, a selector time phase shift in the status-time-shift register, the analogue output signal from the decoders being applied also to the analogue switches in the apparatus of the addresser and the addressee for establishing connection between the addresser and addressee over the hybrid junctions until the addresser or addressee, by actuating the switch-off press button, interrupts the communication.

An embodiment example of a system according to the invention is further explained hereinbelow with reference to the drawings.

FIG. 1 A-C illustrates a circuit diagram for an apparatus, a central exchange unit and a common circuit for ten apparatus in the central exchange, in a unit according to the invention.

FIG. 2 is a block diagram of a central exchange for a system according to the invention.

Figure 3A:
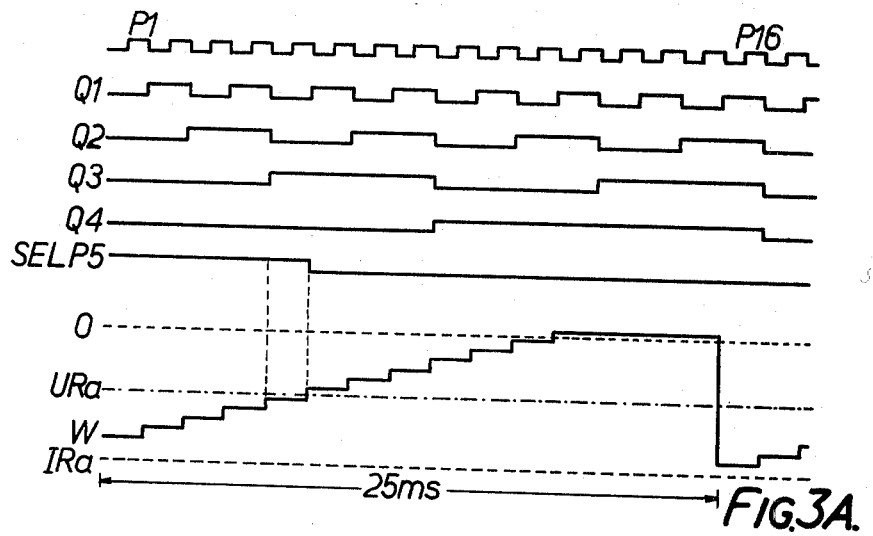
Figure 3B:
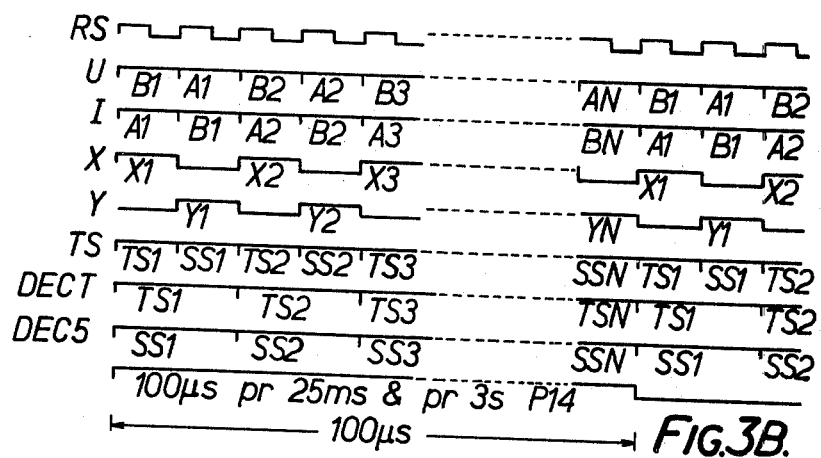

FIG. 3 A-C illustrates, as the function of time, three groups of impulses which occur at various locations in the system during operation.

For simplicity's sake, only one apparatus (FIG. 1A), viz. the addresser's, is illustrated, however, the second apparatus, that of the addressee, as described hereinbelow corresponds to the apparatus illustrated and the same applies to each apparatus unit (FIG. 1B) in the central exchange; the common circuit (FIG. 1C) applies for ten apparatus, viz. a decade. The central exchange is illustrated for one hundred apparatus, that is to say ten decades.

The apparatus of FIG. 1A comprises a microphone M and a loud-speaker H with appurtenant amplifiers F which, via an electronic hybrid junction, are connected by a two-wire connection to the central exchange. The apparatus is supplied, via the circuit connection, from a voltage source (not shown) in the central exchange and the voltage is stabilized by the coupling in series of the diode D1 and Zener-diode Z1 with the charging condenser CS coupled in parallel, the series coupling being supplied with constant current from the transistor T1 determined by the resistance in the emitter circuit thereof. The current is normally determined by the resistance R14 in series with a lighting diode LED which lights when the apparatus is in operation.

On actuating a switch S, the current increases in that the resistance R13 is coupled in parallel with the R14 and, when the apparatus is in operation, by actuating the switch, information can be given to the central in that the apparatus current is altered without the speech channel being interrupted. A case in point is, for example, the manual control of the conversation direction (simplex operation).

The transistor T1 obtains its basic current through the coupling in series of the resistor R12 and Zener-diode Z1 and is blocked if the voltage over Z1 is higher than the threshold voltage thereof. The transistor T2 is in series with the current supply and is normally conductive in that the base is connected to the plus-pole of the feed voltage through a voltage divider R1-R11 which forms the address selector together with the selector contacts 1-0.

On operating the selector contacts, the base in the transistor T2 is connected to the emitter, such that T2 is blocked and the amplifier current circuit is isolated from the wire terminals L at the same time as voltage dividing is initiated for address selection. The resistance R11 in the voltage divider is selected of sufficient magnitude, that on actuating the shut-off contact OFF, so great a resistance occurs between the wire terminals L that it is interpreted in the central exchange as an interruption and this signifies shut-off information, which prevents the apparatus units in the central exchange from being connected when the apparatus is unconnected.

The speech signals are transmitted over the wire terminals in that the signal-alternating current is superimposed on the feed current. Diodes D2–D5 form a ring rectifier and ensure that the feed voltage has the correct polarity independent of the polarity of the wire terminals L. In regard to signals, the amplifier is referred to the positive wire terminal, the input and output of the amplifier being connected to the negative wire terminal through the condenser CK. The amplifier is fed through the transistor T1 which, signal-wise, is coupled in parallel with the wire terminals L. Since the transistor T1 has a very great dynamic impedance, it is only the resistance R12 which effectively loads the signal channel. The inner resistance of the amplifier parallel to the resistance R12 is adapted to the terminal impedance of 600 ohm.

The apparatus via the transmitting wire is connected to the respective apparatus unit of FIG. 1B, if terminals L are connected to a coupling transformer TR which separates the speech signal from the direct current at the same time as the wire balances to earth potential through condensers Cb and Cc.

When the apparatus unit is not in operation, the transistor Ta is blocked and is supplied with very little current through the resistors Ra, Rb and Rc and the transformer TR; since Rc is selected relatively large, but not larger with respect to R11 in the apparatus than that the voltage over the wire terminals is determined by the fact that the Zener-diode Z1 barely conducts. The transistor T1 then conducts so little emitter current that the lighting diode LED does not light, and so little collector current that the amplifier is blocked. The diode D1 is then locked such that the Zener-diode Z1 is not short-circuited by the feed voltage terminals of the amplifier. The voltage over the wire terminals of the apparatus will then be somewhat higher than the threshold voltage UZ1 of the Zener-diode Z1.

A reference voltage U1 for a comparator K1 is selected less negative than UZ1 such that the comparator K1 yields logic 0 which represents the most negative voltage.

When an address selector switch is operated, a part of the voltage divider R1-R10 is coupled in between the apparatus terminals L and the resulting resistances are selected sufficiently low that the voltage over the terminals is then less than U1, so that:

$$\frac{(30V - 2UD)(R1 + R2 + \ldots\ldots R10)}{Ra + Rb + Rc + RTR + R1 + R2 + \ldots R10} < U1$$

where UD is the diode voltage in direction of transmission and RTR is the primary resistance in the transformer TR. The comparator will then transmit logic 1 to the appurtenant input in the encoder ENC1 the output F of which transmits logic 1 simultaneously with a 4-bit binary combination of the four outputs with the common symbol T. As each of the encoder's 10 inputs is connected with respective apparatus units (FIG. 1B), the output signal F represents the address of a group of ten apparatus, the binary combinations T representing the address of one of these ten apparatus.

As illustrated in FIG. 2, the output F from ten encoders ENC1 is connected with respective inputs in an encoder ENC2, the output T from all apparatus units being connected in parallel in a four-wire line with the input b2 in a four-bit data selector DS2. The four-bit output from the encoder ENC2 is connected over a four-wire line to the input b1 in a data selector DS1. The output from the data selectors DS1 and DS2 are connected with respective four-bit shift register REG 0 and REG 00.

The communication circuits of the system are time-multiplexed with a testing time of 100 μs, and, since they operate with four-wire lines, each communication line requires two time phases which are here called x-phase and y-phase, such that communication 1 is signified by x1 and y1, communication 2 by x2 and y2, etc. The register shift frequency fRS is determined by the number of communications N, such that:

$$fRS = \frac{2N}{100} \text{MHz}$$

and communication time phase $$T = \frac{100}{N} \mu s$$

Normally, the input a1 respectively a2 in the data selectors is prepared such that the data in the shift registers REG 0 and REG 00 are retained by recirculation. On actuating an address selector switch in the addresser's apparatus, one of the inputs in the encoder ENC2 will have logic 1 and the four-bit output will transmit a four-bit combination which represents the addresser's first cypher, in other words the group cypher, and the output E will transmit logic 1. The output E is connected to an input in an AND-gate circuit A1 with three inputs of which the second is connected to a free indicating circuit LS and the third input is applied with the Y-phase signal and in this time phase the AND-gate circuit transmits logic 1 to the control input b1 respectively b2 in the data selectors DS1 and DS2 respectively, the addresser's address being introduced into the y-phase with the first cypher in the shift registers REG 0 and second cypher in shift register REG 00.

In parallel with these shift registers, a status-time-shift register ST operates which stores data for the communication status and time phases during the address selector operation, the communication status being introduced in the x-phase and the communication time phase introduced in the Y-phase A free communication is represented by status S0. The free-indicating circuit LS can, for example, lock first occurring status S0 from the status register in accordance with a determined recording impulse.

Updating the status-time-shift register ST is carried out by an adding circuit ADD in a recirculation loop for the register, a gate circuit combination 02, A5, 03, A6 controlling the addition of +1 to the time phases, since the AND-gate circuit A6 only conducts in the x-phase, the one-bit data selector DAS controlling addition of +1 in the status phases since DAS is only conductive in the y-phase at the input S. DAS has eleven inputs 0–10 which may each be connected to the output R depending on the four-bit combination of the address input D. As the address input D is connected to the output from status-time-shift register ST, the prepared inputs 0–10 will correspond to the stored status phases. A communication will retain its status phase until logic 1 occurs in the time phase of the communication on that of inputs 0–10 which corresponds to the status phase. The input 0 is connected to the output from the AND-gate A1. The output R from DAS will have logic 1 in the free-indicated communication y-phase, such that +1 is added to the status phase which is introduced in the status-time-shift register ST as S1 and the communication is thereby indicated engaged. Since each communication requires two time phases, the length of the shift registers is established at 2N + 1 bits. The recirculation loop is disconnected after 2N bits; however, the introduced data must also be accessible both after 2N-1 bits and after 2N + 1 bits, such that data introduced in the x-phase can be accessible in the y-phase and conversely.

In the shift registers it is indicated how the data are disposed with respect to the outputs in the x-phase and y-phase of the communication. The gate circuit combination A9, 04, A10 transmits logic 1 to the input E in a decoder DEC3 in the y-phase, if status is different from S0, and in both the x-phase and y-phase, if the status is S10. The gate circuit combination A11, 05, A12 transmits logic 1 to the input E in a decoder DEC4 in the x-phase, if status is different from S0, and in both the x-phase and y-phase, if status is S10. The binary input in DEC4 will, in the x-phase, be connected to the output 2N−1 from the address shift register REG 0, and, in the y-phase, with the output 2N+1 thereof by means of a data selector DS3. In the same manner, the binary output I will be connected to the output 2N−1 in the x-phase of the address shift register REG 00 and with the output 2N+1 in the y-phase by means of a data selector DS4.

The binary input in a decoder DEC S will, in the x-phase, be connected to the output 2N−1 in the status-time-shift register ST and, in the y-phase, to the output 2N by means of a data selector DS7. Logic 1 occurs therefore both in the x-phase and the y-phase on the output of the outputs S0-S15 from the decoder DEC S which corresponds to the status phase of the particular communication. In the same manner, a data selector DS6 connects the binary input in a decoder DEC T to the output 2N respectively 2N+1 in the status-time-shift register ST, such that logic 1 occurs both in the x-phase and y-phase in the output T0-T15 from DEC T which corresponds to the time phase in which the particular communication is located.

After the 2N−1 shift impulses from the addresser's address are introduced into the free-indicated communication y-phase, the first cypher of the addresser appears as logic 1 on the output Ei from the decoder DEC4 which corresponds to this cypher and the second cypher of the addresser will occur in binary code in the output I from the data selector DS4.

After N shift impulses, that is to say in the y-phase, the first cypher of the addresser occurs with logic 1 on the output from Eu from the decoder DEC3 which corresponds to this cypher, and the second cypher of the addresser occurs in the binary code in the output U from the address shift register REG 00.

In both the x-phase and the y-phase, the output S1 from the decoder DEC S has logic 1 which indicates that the communication is now in status phase S1. The free-indicating circuit LS from now on will not indicate free communication, but, after at least 2N shift impulses indicate a new communication which is in status phase S0.

The decoder DEC1 is now prepared in the x-phase in that the input Ei is connected to the output in the decoder DEC4 corresponding to the first cypher of the addresser (the decade) and the binary code in the input I, corresponding to the second cypher of the addresser, is decoded to logic 1 on the output 1 from the decoder DEC1 in the x-phase.

The decoder DEC2, on the other hand, is prepared in the y-phase in that the input Eu is connected to the output from the decoder DEC3 corresponding to the first cypher of the addresser, and the binary code in the input U, which corresponds to the addresser's second cypher, is decoded to logic 1 on the output 1 from the decoder DEC2 in the y-phase.

The hybrid junction HY is connected, at its input via the analogue switch ANI and a low-pass filter LPF1, to the input line LI in the x-phase of the communication, and the output of the hybrid junction is connected via the low-pass filter LPF2 and analogue switch ANU to the output line LU in the y-phase of the communication.

In consequence of the output signal 1 from the decoder DEC1, the transistor Ta will remain conductive, also during the impulse intervals, due to a charge circuit INT, and − 30V will be applied to the input + of the comparator K1, such that the output thereof assumes logic 0. The encoder ENC2 assumes logic 0 at the output, such that the apparatus of the addresser cannot be connected to the next free-indicated communication. Since free-indicating circuit LS transmits free-indicating impulses with intervals of 4 N shift impulses, the transistor Ta has at least 2N shift impulses to react to, i.e. 100 μs.

Inasmuch as the first actuated address selector switch of the addresser is still operative, a stable direct voltage URa will, during a time period of about $tk = 5$ Ra (CL + Cb), have been adjusted over the resistance Ra, the capacity in the wire connection between tha apparatus (FIG. 1A) and the apparatus units (FIG. 1B). The capacity of the capacitor Cb is selected much greater than the greatest possible value of CL, such that $tk = 5 . Ra . Cb$ and $$URA(u) = \frac{(30 - 2UD) \cdot Ra}{RS + R1' + \ldots . Rn}$$

where $R1' = Ra + Rb + RTR + R1$, u indicating the switch being operated and RS being the loop resistance in the wire connection between the apparatus and the apparatus unit in the central exchange.

A step voltage W (see FIG. 3A) is applied to the input in a comparator K2, said step voltage being supplied by a step voltage generator DEC W in the central exchange. FIG. 3A illustrates how the step voltage W is orientated with respect to the impulse train P with 16 time phases and a repetition time of about 25 ms. The first 10 time phases P1 − P11 represent the address cyphers 1-0. P11 represents an operation control impulse, and the time phases P12 − P15 represent, in this case a single information, viz. the switch-off of a connection. The time phase P16 serves to control simplex-operation. Each stage in the step voltage corresponds to one of the time phases.

The step voltage generator is dimensioned such that reliable address selection is achieved with a resistance tolerance of ± 2% in the address selector, a variation in the loop resistance RS of from 0 to 26052, at the same time, the wires can have a leakage resistance of 60 k Ω to earth and 120 k Ω between them. Furthermore, the capacitor Cb is selected large enough effectively to disconnect noise signals over the reference resistance Ra.

Since both the address selector and step voltage generator of the apparatus have the same voltage source, a possible variation in operative voltage will not affect the selector proficiency.

The output from the comparator K2 is applied to one input of an AND-gate circuit A the other input of which is connected to the output 1 from the decoder DEC1 and will, therefore, after a time period tk, with reliability, transmit logic 1 from and including time phase P1 to and including time phase Pn of the selected cypher, and the OR-gate circuit 0 will, therefore, in the x-phase, assume logic 1 on its output SEL. The output SEL is connected to one input in an OR-gate circuit 01 and a data selector DS5 is provided on the input b5 such that 0 is introduced in the x-phase in the status-time-shift register ST, i.e. the time phase is adjusted to T0 in the selector period P$l$ to P$n$ for as long as the selector switch is operative.

The gate circuit combination 02, A5, 03, A6 ensures that +1 is added to the time phase during the course of the impulse P14 the time phase of which is previously T0 or T1. This means that, for the period of time the selector switch is operative, the time phase is adjusted to T0 during the selection and to T1 in the time phase P14.

Figure 3C:
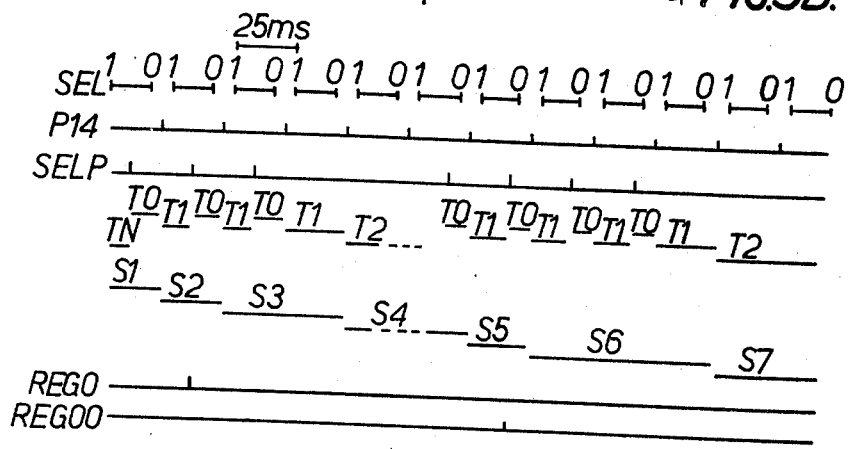

FIG. 3C illustrates how the status and time phases change during a normal address selection.

As the output from an AND-gate circuit A7 is connected to the inputs 1, 2, 4 and 5 in the data selector DAS and the output from an AND-gate circuit A8 is connected to the inputs 3 and 6 in DAS, the status phase in the time phase P14 will shift from S1 to S2 and from S2 to S3, or from S4 to S5 and from S5 to S6, if the time phase is T0. If the time phase is T1, the status phase in the time phase P14 will shift from S3 to S4 or from S6 to S7. When the status phase S2 occurs, the data selector DS1 of the binary input C1 is prepared from time phase P1 to P$n$ corresponding to the selected cypher, in the x-phase via the AND-gate circuit A3.

The binary information Q comprises the signals Q1, Q2, Q3 and Q4 from the impulse generator as illustrated in FIG. 3A. The binary value of Q shifts synchronously with the impulse train P1–P16. When Q is applied to the input C1 of the data selector DS1, the selected or the addresser's address cypher will be introduced in the address shift register REG 0, since this is the last occurring value of Q in the status phase S2 and it is ensured that a time period of at least $tk \cong 5Ra \cdot Cb$ from the operation of the address selector contact has passed before the cypher is introduced into the address shift register REG 0, since the status phase S2 and the selected cypher's time phase occur simultaneously for at least one impulse train, i.e. 25 ms, after the address selector switch was actuated, and the time phase T0 can only be adjusted in the period from P1 to P$n$ corresponding to the time phase of the selected cypher.

The status phase, in the next time phase P14, will shift from S2 to S3, since the time phase is still T0, so that the AND-gate circuit blocks and prevents any incorrect insertion in the address shift register REG 0 when actuation of the address selector switch is terminated, and the voltage over R$a$ changes relatively slowly in consequence of the recharge time of the capacitor C$b$, provided that the address selector switch is actuated for at least 50 ms. When the actuation of the switch is terminated, the voltage over R$a$ is determined by the constant current source in the apparatus which occurs because the transistor T1 conducts at the same time that the voltage over the apparatus (30V) is substantially greater than the threshold voltage for the Zener-diode Z1.

The constant current 1h is selected high enough that the lighting diode LED in the apparatus lights and operative energy is supplied to the apparatus amplifier F, at the same time as the voltage drop over R$a$ is sufficiently great that the input + in the comparator K2 is more negative than the step voltage W in all time phases of the impulse train, i.e. the output from the comparator K2 continuously has logic 0. In the first time phase P14, after the address selector switch is released, the status phase shifts from S3 to S4, because the time phase is now T1 since it is no longer shifted to T0 by the selector information. At the same time, +1 is also added to the time phase which then becomes T2. After 2N shift impulses, the OR-gate circuit 02 will assume logic 0 in the output and an adding circuit ADD adds +1 in the x-phase (time phase), in the time phase P14 every third second.

If, therefore, an address selector switch is not actuated for the next cypher during the course of 40 seconds, the time phase will have reached T15 and reset the addresser's apparatus because the status level is adjusted to S0 via the AND-gate circuit A0.

If, on the other hand, the next address selector switch is actuated during the course of the said 40 seconds the time phase is again adjusted to T0 and, in the same manner as the binary value of the first cypher was inserted in the address register REG 0 when the status phase was S2, the binary value of the second cypher will be inserted in the address register REG 00 via the AND-gate circuit A2 in the status phase S5. When the address selector switch is released, the status phase will change from S6 to S7 which is a waiting position for possible testing S8 for possible function transfer, and the input 7 in DAS has logic 1 and +1 is added to the status phase. If the addressee is engaged, the status phase is brought to S9; or to S10, if the addressee is free, and the connection is established over the input wire LI. The AND-gate circuit A0 is now blocked and the connection is not reset when the time phase T15 occurs. The conversation status is the only stable status, all other statuses are reset sooner or later, i.e. to the status phase S0, because the status time register ST works up to time phase T15 in steps of 25 ms to T2 and with steps of 3 seconds from T2 to T15.

The AND-gate circuits A4 and A10 will be prepared as long as the communication continues, such that the decoders DEC3 and DEC4 will be prepared both in the x-phase and y-phase.

The first cypher of the addressee, which was introduced in the address register REG 0 in the x-phase of the communication, will, in a corresponding manner as described for the addresser, be decoded in the decoders DEC3 and DEC4, however, such that, in the y-phase, the first cypher of the addressee will be represented by logic 1 on the output E$i$ from the decoder DEC4 corresponding to the cypher, and the addresses's other cypher occurs as binary code on output I. In the x-phase, the output Eu from the decoder DEC3 corresponding to the first cypher has logic 1, the second cypher occurring as binary code in the output U.

The transistor Ta in the apparatus of the addresser will now be conductive because the charge circuit INT is activated by logic 1 from the decoder DEC1 in the y-phase of the communication. Simultaneously, the analogue switch ANI will be conductive in the y-phase of the communication, the analogue switch ANU being conductive in the x-phase of the communication, i.e. conversely with respect to the addresser.

If the analogue switch ANP, which is connected between the transfer wire LI and LU, is conductive in the x-phase, the addressee can speak to the addresser because the hybrid junction output of the addressee and hybrid junction input of the addresser are interconnected in the same time phase. If, on the other hand, the analogue switch ANP is conductive in the y-phase, the addresser can talk to the addressee. Since the analogue switch is controlled by a duplex connector DP, it is this which at all times determines the direction of speech and it operates in timemultiplex synchronously with the address register. The control of the analogue switch ANP is based on the signal level measurements undertaken by DP on the speech output wire LU. The signal levels are converted to digital information which is stored in the shift registers for control of DP.

The conversation can be terminated either by the addresser or the addressee by actuating the switch OFF. If the addresser actuates the switch OFF, logic 1 will occur in the x-phase of the communication on the input SEL, inter alia, in the time phase P12. Since the OFF-information which comprises the time phases P12 – P15 represents the time phase shown with respect to the step voltage W, P12 cannot occur in the other selector time phases, including the simplex time phase.

As will be clear from FIG. 3A, P12, on the other hand, will occur on SEL when the apparatus is not connected if the apparatus unit in the central exchange is actuated for some reason or other, for example, by random noise effect.

The flip-flop circuit FF will now be reset and the output Q is logic 0 until logic 1 on the data input D is adjusted by the next communication's positive impulse flank in the x-phase. In this manner, the SEL information, which in this case only comprises the x-phase of the communication, is extended also to comprise the y-phase.

If the addressee actuates the switch OFF, the time phase P12 on SEL will occur only in the y-phase. In both cases, the AND-gate circuit A4 will have logic 1 in the output in the y-phase and data selector DS1 resets the status-time register ST to 0, i.e. to the status phase S0 and the connection is broken.

Having described my invention, I claim:

1. In a system for addressed time multiplexed telecommunication, comprising apparatus each having, in electrical circuit with each other, an information transmitter and an information receiver, a hybrid junction and address selector, and a central exchange having an apparatus unit with coupling transformer and separator circuits for each apparatus, an impulse generator which generates impulses for operation of the system, registers for storage of the apparatus' addresses and status, and logic circuits; the improvement in which the impulse generator comprises means continuously generating impulse trains having at least twelve selector impulses (P) and continuously generating shift impulses (RS) for the registers and for time multiplexing, and control pulses (Q) for encoding and decoding in determined relationship to the selector impulses for control of a voltage generator (DECW), the address selector being a voltage divider which, on actuation, supplies voltage levels corresponding to the address which are applied to a first comparator (K1) in which the address selector voltage is compared to a permanent reference voltage (U1) the output signal of which is applied to encoders (ENC1, ENC2) for conversion from analogue to binary form and, under control of a free communication time phase (S0) the addresser's own address is introduced by cypher into address shift registers (REG 0, REG 00) at the same time that a communication status displacement is caused in a status-time-shift register (ST), means to apply the output signals from the address shift registers to decoders (DEC1–4) for conversion from binary to analogue form and cause the output signal from a second comparator (K2), in which the address selector voltage levels are compared to the step voltage from the step voltage generator, to establish the time phase of the selected address cyphers in an impulse series (P1–P0) which are introduced into the address shift registers in binary form at the same time that a selector time phase displacement is effected in the status-time-shift register, and the analogue output signal from the decoders is also applied to analogue switches (ANL, ANU), in the apparatus of the addresser and addressee for effecting communication between the addresser and addressee over the hybrid junctions (HY), until the addresser or addressee, by actuating an switch-off press button, brings the communication into free status (S0).

2. System according to claim 1, characterized in that the impulse train comprises a further impulse for conversion to simplex operation of the system.

3. System according to claim 1, characterized in that the length of the time phase in which the addresses are stored in the address shift registers corresponds to the communication time phase in the time multiplexing.

4. System according to claim 1, characterized in that the register shift frequency $$fRS = \frac{2N}{100} \text{MHz}$$

wherein N is the number of communications, and that the communication time phase $$T = \frac{100}{N} \mu S.$$

5. System according to claim 4, characterized in that the length of the shift registers is 2N + 1 bits.

6. System according to claim 1, characterized in that in a wire connection between the apparatus and the apparatus unit in the central exchange, a delay component ($Ra \cdot C_b$) which, in connection with the capacity ($C_L$) in the wire connection, ensures that the address voltage level is built up first over the second comparator (K2) about 25 ms after the actuation of the address selector, and that the capacity of the capacitor ($C_b$) is much greater than the wire capacity ($C_L$), whereby noise signals on the wire connection are disconnected over the resistance ($Ra$).

* * * * *